(12) United States Patent
Levin

(10) Patent No.: US 7,222,659 B2
(45) Date of Patent: May 29, 2007

(54) HEAT AND COLD STORAGE MULTISTAGE TOWER WITH APPLICATION OF PCM

(76) Inventor: Alexander Levin, 5A Shvil Hachalav St., Binyamina (IL) 30500

(*) Notice: Subject to any disclaimer, the term of this patent is extended or adjusted under 35 U.S.C. 154(b) by 98 days.

(21) Appl. No.: 11/103,227

(22) Filed: Apr. 12, 2005

(65) Prior Publication Data
US 2006/0225863 A1    Oct. 12, 2006

(51) Int. Cl.
*F28D 5/02* (2006.01)
(52) U.S. Cl. .................... 165/10; 165/115; 165/104.13
(58) Field of Classification Search ................ 165/10, 165/902, 115, 104.11, 104.13, 104.14, 104.19, 165/104.21; 126/617, 618
See application file for complete search history.

(56) References Cited

U.S. PATENT DOCUMENTS

| 4,086,958 | A |   | 5/1978  | Lindner et al.   |        |
|-----------|---|---|---------|------------------|--------|
| 4,088,183 | A |   | 5/1978  | Anzai et al.     |        |
| 4,111,260 | A |   | 9/1978  | Bricard et al.   |        |
| 4,234,782 | A | * | 11/1980 | Barabas et al.   | 165/10 |
| 4,241,782 | A | * | 12/1980 | Schoenfelder     | 165/10 |
| 4,270,523 | A |   | 6/1981  | van Heel         |        |
| 4,286,574 | A | * | 9/1981  | Vrolyk et al.    | 165/10 |
| 4,371,029 | A |   | 2/1983  | Lindner et al.   |        |
| 4,408,659 | A | * | 10/1983 | Hermanns et al.  | 165/10 |
| 4,524,756 | A | * | 6/1985  | Laverman         | 165/10 |
| 4,807,696 | A | * | 2/1989  | Colvin et al.    | 165/10 |
| 4,993,481 | A | * | 2/1991  | Kamimoto et al.  | 165/10 |
| 6,037,032 | A | * | 3/2000  | Klett et al.     | 428/71 |
| 6,116,330 | A |   | 9/2000  | Salyer           |        |
| 2002/0000306 | A1 |   | 1/2002  | Bradley       |        |

FOREIGN PATENT DOCUMENTS

JP    57-204796    * 12/1982

OTHER PUBLICATIONS

Peter R. Payne, Which material uses the least energy?, Chemtech, Sep. 1980, pp. 550-557.

* cited by examiner

*Primary Examiner*—Teresa J. Walberg
(74) *Attorney, Agent, or Firm*—Dr. D. Graeser Ltd.; D'vorah Graeser

(57) ABSTRACT

A heat management system include including application of phase change materials (PCM). A heat or cold storage multistage tower has a housing with a multistage system of flat rigid container. A significant fraction of internal space of each container is filled with PCM; these containers are fabricated from ceramics, glass, glass ceramics or sulfur concrete. Another version of the heat or cold storage tower is based on application of multi-channel blocks from ceramics, glass, glass ceramics or sulfur concrete; the parallel internal vertical channels of the blocks are open and sealed at their bottoms alternatively, and the channels with the sealed bottoms are filled partially with PCM. The tower achieves effective heat transfer between a heat transfer fluid (HTF) and PCM in the processes of charging and discharging of the containers with heat or cold.

18 Claims, 8 Drawing Sheets

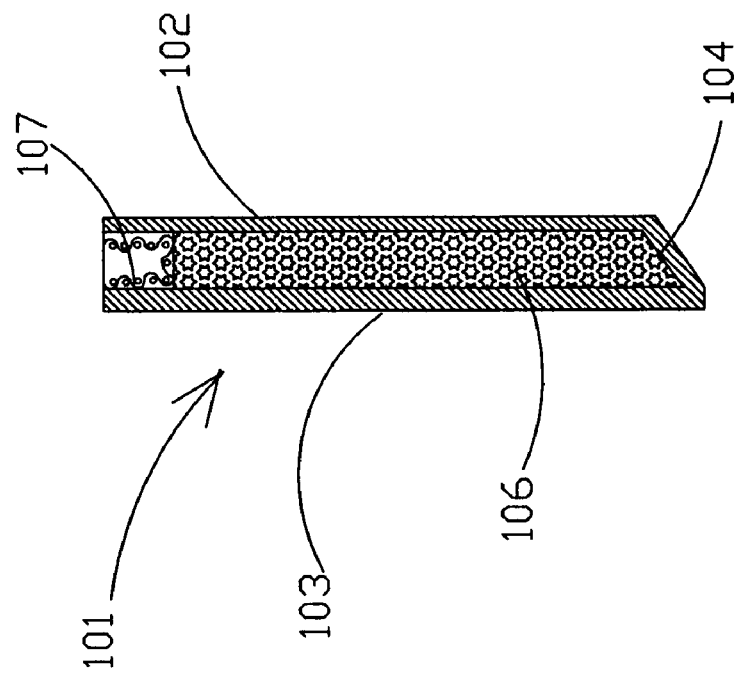
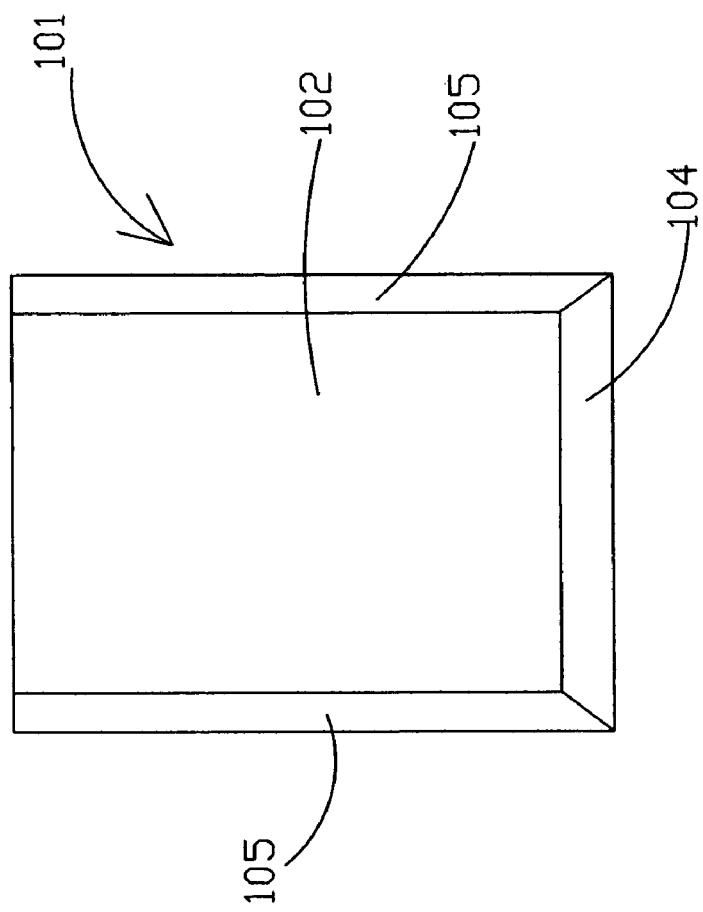
FIG. 1a
FIG. 1b

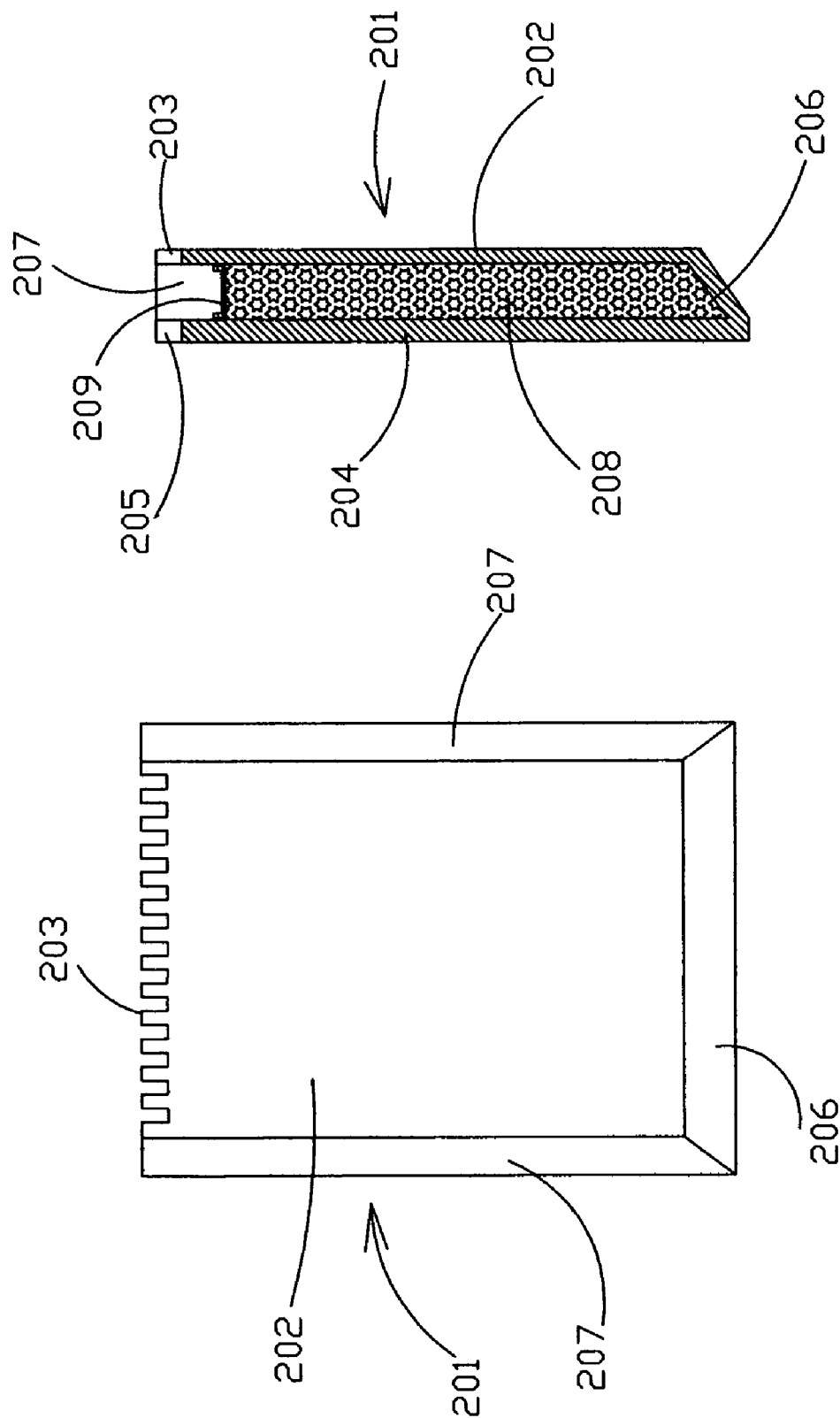

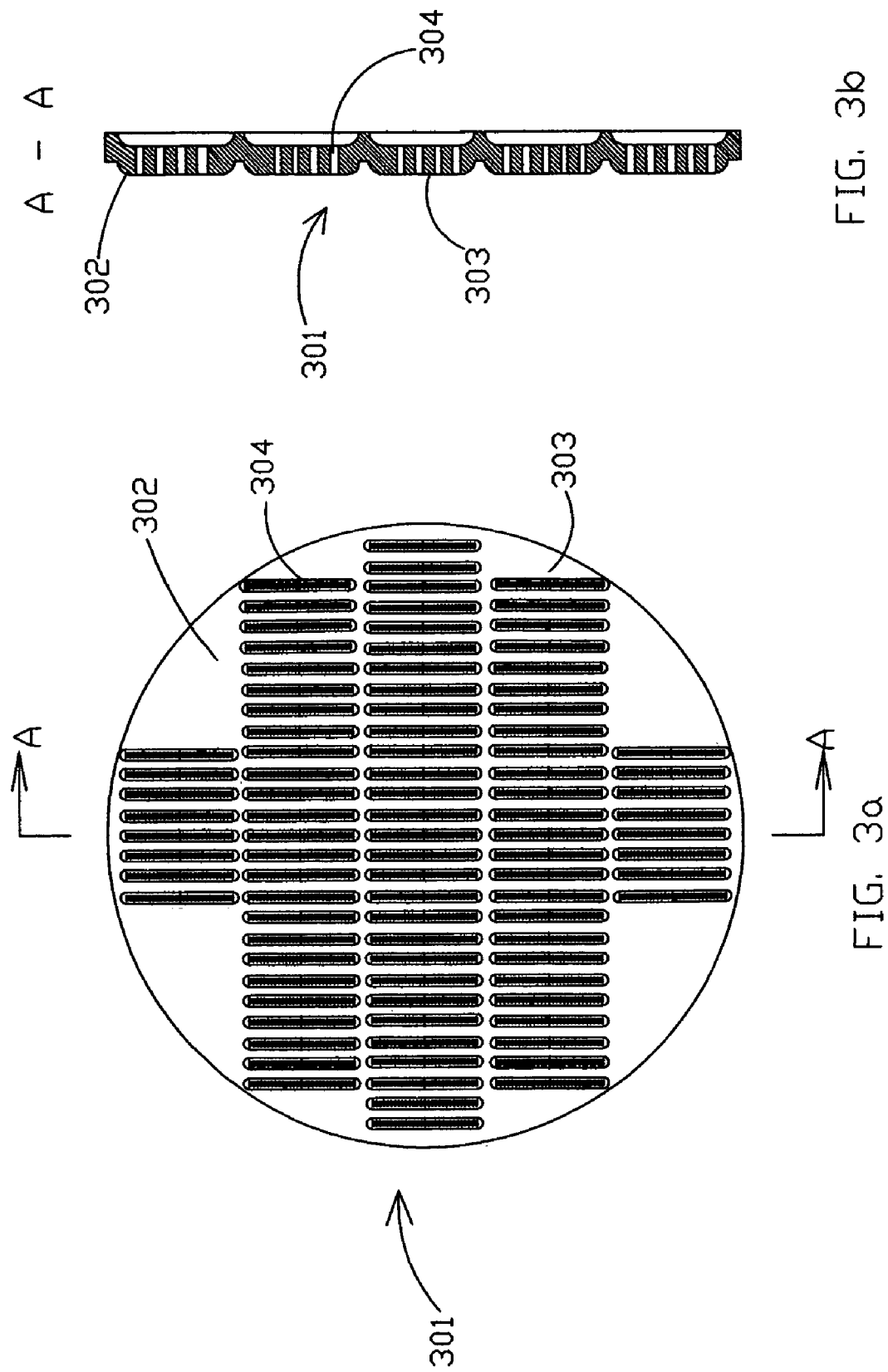

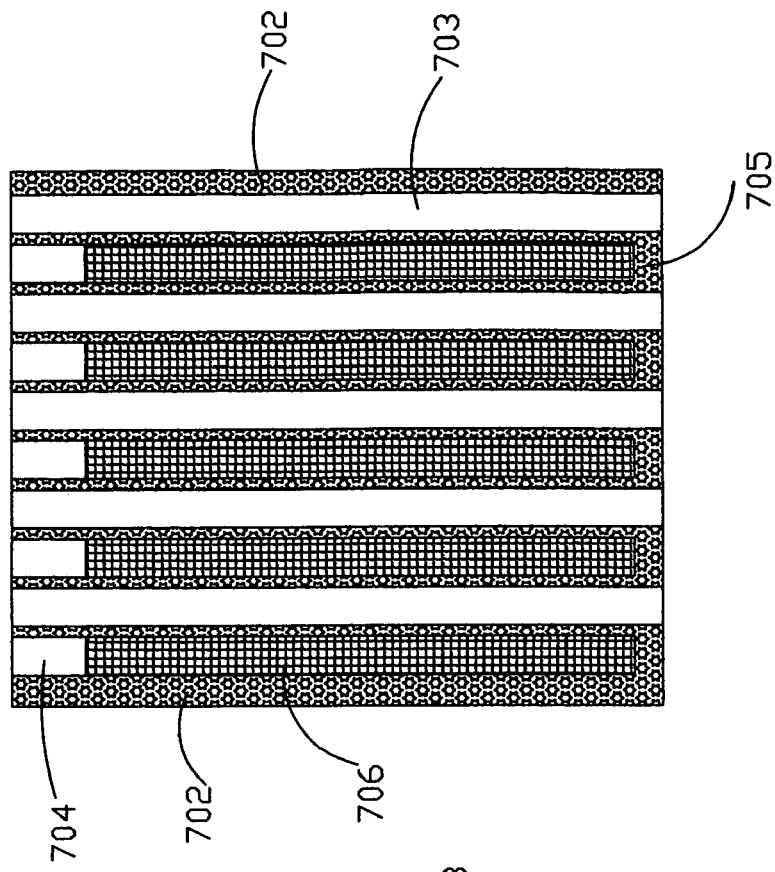
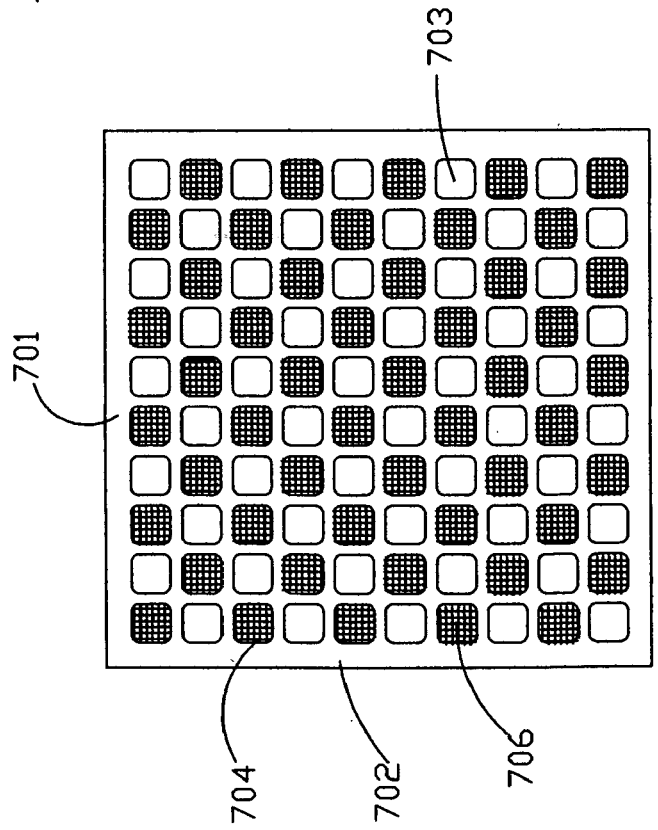
FIG. 7b
FIG. 7a

HEAT AND COLD STORAGE MULTISTAGE TOWER WITH APPLICATION OF PCM

BACKGROUND OF THE INVENTION

This invention relates to the area of heat or cold management systems and, specifically, to the heat or cold management systems, which include application of phase change materials (PCM).

The main field of usage of these heat or cold management systems is thermal solar power plants that apply some types of optical concentrators of solar radiation in order to achieve sufficiently high temperature of heat transfer medium flowing in the receiver of a solar collector. However, the proposed heat management system can be used in other fields, for example, for decrease of energy consumption in thermal treatment of metals.

Another important application of the proposed heat or cold management system is cold accumulation in the form of ice in large air-conditioning systems in night-time.

It is known, that heat or cold can be stored in materials in the forms of sensible heat or latent heat. A material storing sensible heat can be in liquid form (for example, water, molten salts) and a bed of solid material (for example, concrete or ceramic packing, river rocks). The bed serves as well as a heat exchanging structure.

Heat or cold storage in the latent form is performed usually by phase changes: solid-solid, solid-liquid or solid-liquid accompanied by chemical reactions (in the most cases, by reaction: dehydration-hydration).

This invention proposes a heat management tower with a packing, which can be related to solid-liquid phase change.

It should be noted, that phase-change storage allows to achieve high energy density with resulting economical advantage. Design of a phase-change storage container must provide appropriate technical solutions to problems of poor heat transfer of a phase-change material (PCM), corrosion, possible chemical reaction between the PCM and a heat transfer fluid (HTF), possible change of the PCM volume in the process of the phase change.

Technology of micro- and macro-capsulation is widely used in the modern practice in order to solve these problems.

However, this technology is very expensive and resulting specific cost of stored thermal energy is usually high.

There are some U.S. patents related to the area of heat or cold storage with application of PCM.

U.S. Pat. No. 4,086,958 describes heat exchange method and an apparatus, which are based on direct contact of two non-mixable media. Thermal contact of these media is performed by bubbling the liquid medium through the second medium, when the second medium is in the liquid phase.

U.S. Pat. No. 4,088,183 proposes a thermal energy storage housing that is designed like as a shell-and-tube heat exchanger.

U.S. Pat. No. 4,111,260 describes a thermal accumulator, which is designed as a closed vessel with a set of horizontal trays filled with PCM, when HTF flows across the outer surfaces of the PCM layers in the trays. This construction requires application of special means for holding the PCM in these trays.

U.S. Pat. No. 4,270,523 describes a heat storage apparatus with a plurality of heat exchanging elements mounted in a housing.

Each element has a central portion containing a storage medium, surrounded by portions through which a first and a second heat transfer fluids can be passed in heat contact with the storage medium.

U.S. patent application No. 20020000306 describes a device and method for storing thermal energy. The proposed device comprises: a) a container having inlet and outlet ports and at least one wall; b) at least one cell, this cell having two lateral sides and being placed within the aforementioned container such that the lateral sides of the cell are separated from the wall of the container; and c) at least one phase change material being capable of undergoing a phase change at a functional temperature above melting point of water at one atmosphere or pressure, this phase change material being disposed within the aforementioned cell.

In addition, U.S. Pat. Nos. 4,371,029, 4,807,696 and 6,116,330 should be noted. However, these patents do not provide a construction of a heat or cold storage, which is based on usage of ceramics or glass containers for their filling with PCM.

The article of Peter R. Payne "WHICH MATERIAL USES THE LEAST ENERGY?" (CHEMTECH, September 1980, pp. 550÷557) demonstrates importance of application of ceramics in construction of solar collectors as a low-energy-cost material. Conclusions of this article are true for the case of construction of heat or cold storage plants.

BRIEF SUMMARY OF THE INVENTION

This invention proposes such design of a heat or cold storage multistage tower with PCM, which includes arrangement of the PCM in the form of relatively thin layers situated in flat rigid containers, which are open from above, and with flow of HTF as a liquid film with indirect or partially direct contact with these layers. In another case liquid HTF can fill the most fraction of the free internal space of the tower.

In other versions HTF can be a gaseous medium, two-phase liquid-vapor mixture or steam.

There are two main versions of the design of the heat (or cold) storage containers:

1. In the form of ceramic, glass, glass ceramics or sulfur concrete flat rigid containers mounted on support plates with the use of special auxiliary plates. The flat rigid containers are filled partially with PCM.
2. In the form of blocks from ceramics, glass, glass ceramics or sulfur concrete, which are provided with sets of parallel internal vertical channels; these internal channels are open and sealed alternatively at their bottoms, and the channels with the sealed bottoms are filled partially with PCM.

The housing of the heat or cold storage multistage tower is provided with inlet and outlet connections.

In addition, the heat or cold storage multistage tower is provided with a distributor (in its upper section) and one or more redistributors, which ensure uniform distribution of HTF on the external walls of the flat rigid containers.

It is possible to apply ceramics with open porosity for construction of the flat rigid containers or ceramic blocks. In this case these ceramic details are impregnated by polymer material, which provides their impermeability.

If the HTF fills the most fraction of the free space of the housing of the heat or cold storage multistage tower, than the aforementioned distributor and redistributors are not applied.

It should be noted that in many cases it is possible to admit direct contact of PCM and HTF, when specific weight of PCM is higher than specific weight of PCM, the mutual solubility of HTF and PCM is very low and there are not chemical reactions between PCM and HTF.

The stages of the heat or cold storage multistage tower can be provided with the flat rigid containers, which are filled with different PCM with gradually increasing (or decreasing) of their melting points from one stage to the other.

If water or aqueous solution are used as PCM, then it is possible to arrange in the aforementioned flat rigid containers thin flexible sealed envelopes with a gaseous medium; this allows to prevent formation of high pressure in the flat rigid containers in the process of water (or the aqueous solution) freezing.

The flat rigid containers are open at their tops. This gives possibility to fill the flat rigid containers with PCM. In some cases PCM contains a filler and/or nucleating agent, which improve thermal conductivity of PCM and facilitate its solidification.

In addition, there are support plates, which are installed in the housing at distances, which are somewhat higher than the height of the flat rigid containers.

Each support plate comprises a set of parallel longitudinal recesses with openings; the recesses serve for mounting the lower sections of the flat containers and, on the other hand, for drainage of HTF via their openings.

In addition, there are auxiliary plates with a set of parallel longitudinal openings, the edges of these openings are toothed; the parallel longitudinal openings serve for holding the flat containers and, on the other hand, their toothed edges do not prevent flow of HTF downwards in the form of thin films.

The upper edges of the flat rigid containers can be toothed as well; this facilitates uniform distribution of HTF in the form of thin films on the outer walls of the flat rigid containers.

If the walls of the flat rigid containers are provided with corrugations or dimples directed outwards, than it is possible to obviate application of the auxiliary plates. The outer surface of the flat rigid containers can be provided with vertical grooves, which ensure uniform distribution of HTF on the surfaces of the flat rigid containers.

If the flat rigid containers have small inclination with respect to the vertical direction, than the auxiliary plates can be provided with parallel longitudinal openings without the teeth, the width of these openings is somewhat higher that the width of the flat rigid containers.

The second version of the flat rigid container is based on application of ceramic blocks, which are provided with sets of parallel internal vertical channels; these internal channels are open and sealed alternatively at their bottoms and they are open at their upper ends. The blocks can be produced from concrete, porcelain, cordierite and other ceramic materials. In addition, it is possible to produce these blocks from glass, glass ceramics or sulfur concrete.

The upper edges of the channels in the blocks can be toothed in order to achieve uniform distribution of HTF on the internal walls of the open channels and on the external walls of the blocks.

The abovementioned blocks are situated in the heat or cold storage multistage tower in the form of one or more layers supported by supporting grids, which, in turn, are positioned on supporting rings. Each block can be covered with wire gauze, which has depressions directed downwards in the places of the closed channels; this allows to diminish hydrodynamic interaction between the drops of HTF and PCM situated in the channels, which are sealed at their bottoms.

BRIEF DESCRIPTION OF THE SEVERAL VIEWS OF THE DRAWING

FIG. 1a is a front view of a flat rigid container, which is open at the top.

FIG. 1b is a cross-section of the flat rigid container, which is open at the top.

FIG. 2a is a front view of a flat rigid container, which is open at the top and provided with toothed upper edges.

FIG. 2b is a cross-section of the flat rigid container, which is open at the top and provided with toothed upper edges.

FIG. 3a is a plan view of a support plate.

FIG. 3b is a cross-section of the support plate.

FIG. 7a and FIG. 7b are a top view and a vertical cross-section of the ceramic multi-channel block with the staggered open channels and the channels, which are sealed at their bottoms.

DETAILED DESCRIPTION OF THE INVENTION

Figures 4A, 4B:
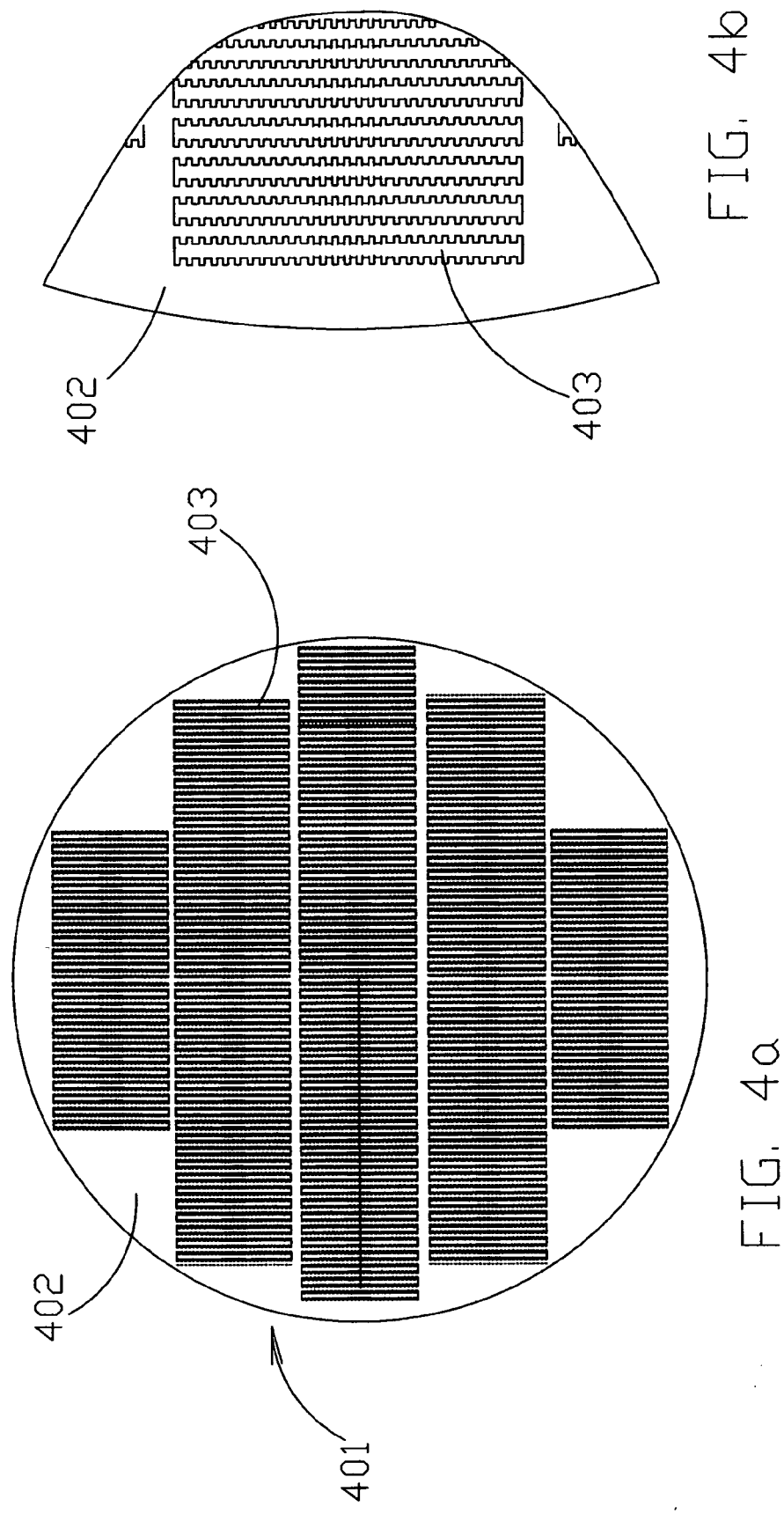
FIG. 4a is a plan view of an auxiliary plate.
FIG. 4b is a detail section of the auxiliary plate.

FIG. 1a and FIG. 1b show a front view and a cross-section of a flat rigid container, which is open at the top. This flat rigid container 101 comprises a front wall 102, a rear wall 103, a lower face plane 104 and two lateral face planes 105. The internal space of the flat rigid container 101 is filled with PCM 106. Wire gauze 107 is installed in the upper section of the internal space of the flat rigid container 101 above the layer of PCM 106.

FIG. 2a and FIG. 2b show a front view and a cross-section of a flat rigid container, which is open at the top and the walls of this flat rigid container are provided with toothed edges. This flat rigid container 201 comprises a front wall 202 with teeth 203, a rear wall 204 with teeth 205, a lower face plane 206 and two lateral face planes 207. The internal space of the flat rigid container 201 is filled with PCM 208. Wire gauze 209 is installed in the upper section of the internal space of the flat rigid container 201 above the layer of PCM 208.

FIG. 3a and FIG. 3b show a plan view and a cross-section of a support plate. The support plate 301 comprises plate 302, which is provided with a set of longitudinal recesses 303; these longitudinal recesses are provided in turn with openings 304.

FIG. 4a and FIG. 4b show a plan view and a detail section of an auxiliary plate. This auxiliary plate 401 comprises plate 402, which is provided with toothed longitudinal openings 403.

Figure 5:
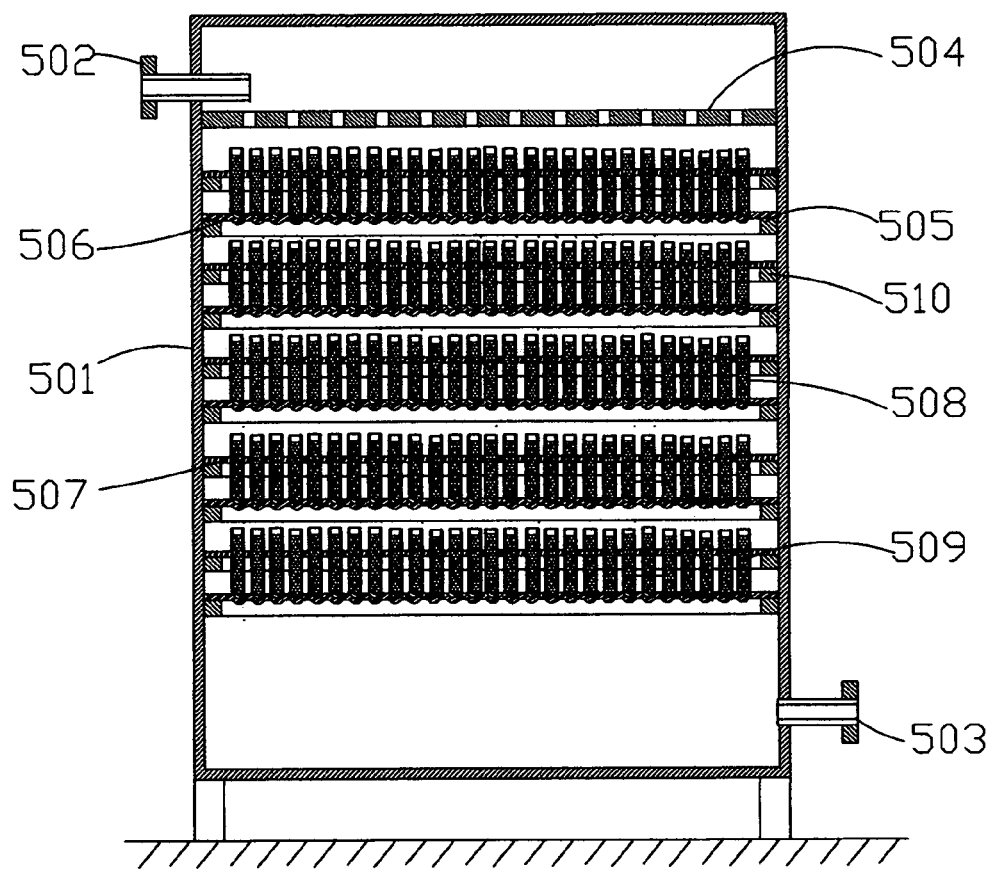
FIG. 5 is a vertical cross-section of a heat or cold storage multistage tower with multistage arrangement of the flat rigid containers open at their tops.

FIG. 5 shows a vertical cross-section of a heat or cold storage multistage tower with arrangement of flat rigid containers. It comprises: housing 501 with inlet and outlet connections 502 and 503; distributor 504; supporting rings 505 and 510; supporting FIG. 5 shows a vertical cross-section of a heat or cold storage multistage tower with arrangement of flat rigid containers. It comprises: housing 501 with inlet and outlet connections 502 and 503; distributor 504; supporting rings 505 and 510; supporting plates 506; auxiliary plates 507; the flat rigid containers 508, which are open at their tops and filled with PCM 509.

Figure 6:
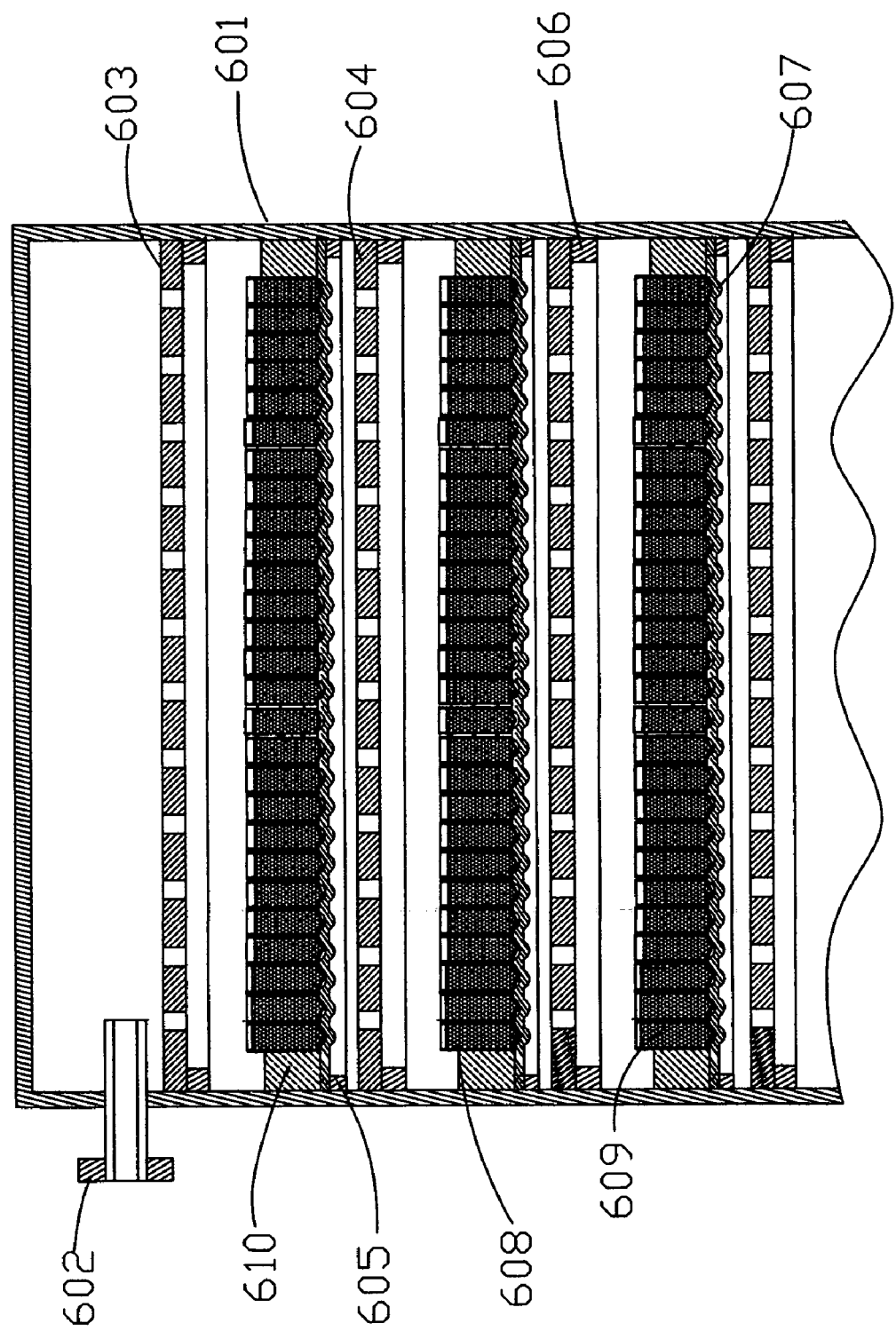
FIG. 6 is a vertical cross-section of the upper section of a heat or cold storage multistage tower with multistage arrangement of the flat rigid containers with corrugations or dimples serving as spacers.

FIG. 6 is a vertical cross-section of the upper section of a heat or cold storage multistage tower with multistage arrangement of the flat rigid containers with corrugations or dimples serving as spacers. It comprises: housing 601 with an inlet connection 602; distributor 603; redistributors 604; supporting rings 605 and 606; supporting plates 607; the flat rigid containers 608, which are open at their tops and filled with PCM 609; check rings 610.

FIG. 7a and FIG. 7b are a top view and a vertical cross-section of the multi-channel block with the staggering open channels and the channels, which are sealed at their bottoms.

It comprises: outer walls 701 and 702; the open channels 703 and the sealed channels 704, which are filled partially with PCM 706 and provided with dead ends 705 at their bottoms.

Figure 8B:
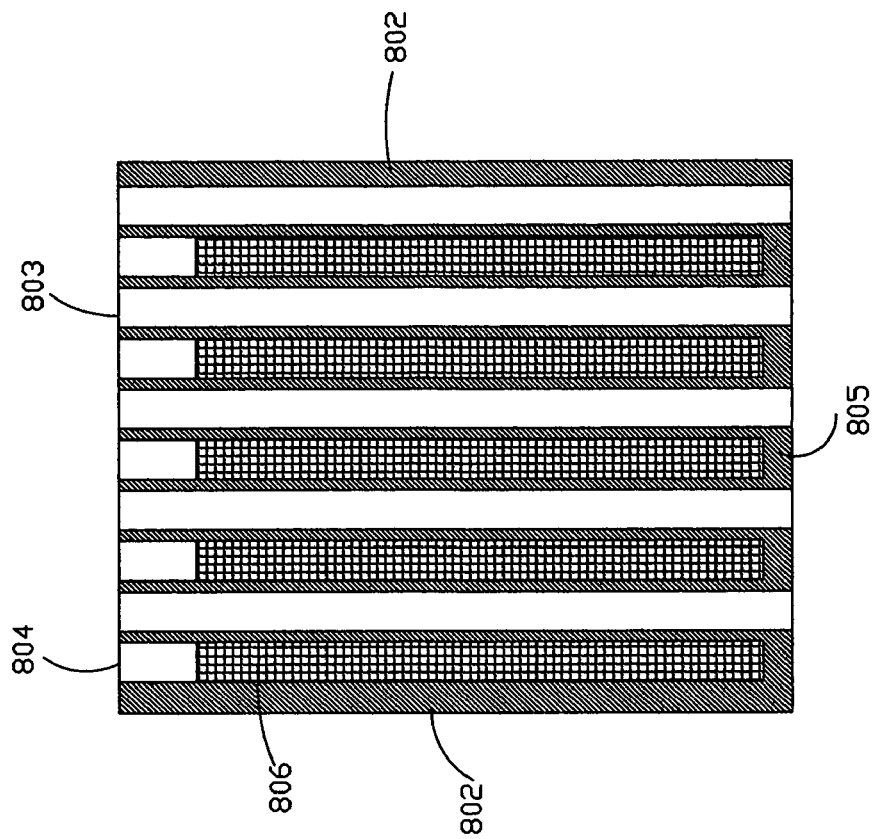
FIG. 8a and FIG. 8b are a top view and a vertical cross-section of the ceramic multi-channel block with the open slot-wise channels and the slot-wise channels, which are sealed at their bottoms.
Figure 8A:
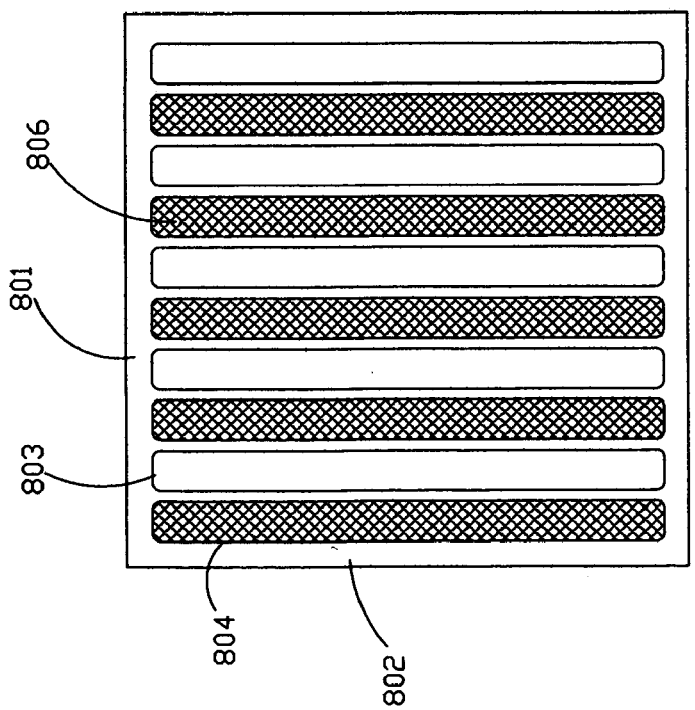

FIG. 8a and FIG. 8b demonstrate a top view and a vertical cross-section of the multi-channel block with the open slot-wise channels and the slot-wise channels, which are sealed at their bottoms. It comprises outer walls 801 and 802, the open slot-wise channels 803, and the sealed slot-wise channels 804, which are filled partially with PCM 806 and provided with dead ends 805 at their bottoms.

What is claimed is:

1. A heat or cold storage multistage tower comprising:
a housing provided with inlet and outlet connections for feeding and withdrawal of a heat transfer fluid (HTF) from said heat or cold storage multistage tower;
a distributor of said HTF, which is mounted in the upper section of said housing;
a multistage arrangement of flat rigid containers in said housing, wherein a top of each of said flat rigid containers is open, wherein said containers are filled with a phase change material (PCM), and wherein said flat rigid containers are fabricated from ceramics, glass, glass ceramics or sulfur concrete;
a plurality of support plates, said support plates being installed in said housing on a plurality of supporting rings, said support plates being located below said flat rigid containers, wherein each support plate comprises a set of parallel longitudinal recesses with openings for mounting the lower sections of said flat containers and for drainage of said HTF;
a plurality of auxiliary plates, which are installed in said housing, with a set of parallel longitudinal openings for holding said flat rigid containers, wherein said openings of said auxiliary plates permit flow of said HTF downwards in the form of thin films.

2. A heat or cold storage multistage tower as claimed in claim 1, wherein said HTF is a liquid medium.

3. A heat or cold storage multistage tower as claimed in claim 1, wherein said HTF is a gaseous medium.

4. A heat or cold storage multistage tower as claimed in claim 1, wherein said HTF is a two-phase liquid-vapor medium.

5. A heat or cold storage multistage tower as claimed in claim 1, wherein said housing comprises at least one redistributor arranged between said stages of said flat rigid containers.

6. A heat or cold storage multistage tower as claimed in claim 1, wherein said HTF fills an entirety or almost the entirety of internal space of said tower.

7. A beat or cold storage multistage tower as claimed in claim 1, wherein said PCM is provided with filler for improving thermal conductivity or with filler comprising a nucleating agent, or a combination thereof.

8. A heat or cold Storage multistage tower as claimed in claim 1, wherein the upper edges of said flat rigid containers are toothed.

9. A heat or cold storage multistage tower as claimed in claim 1 wherein at least one wall of each said flat rigid container is provided with corrugations or dimples directed outwards.

10. A heat or cold storage multistage tower as claimed in claim 1, wherein wire gauzes or other covers are arranged below said open top and above said PCM in said flat rigid containers.

11. A heat or cold storage multistage tower as claimed in claim 1, wherein said flat rigid containers are situated with small inclination to the vertical direction, and said longitudinal openings in said auxiliary plate are not toothed and have a greater width than the width of said flat rigid containers.

12. A heat or cold storage multistage tower as claimed in claim 1, wherein the walls of said flat rigid containers are provided with vertical outer grooves.

13. A heat or cold storage multistage tower as claimed in claim 1, wherein said flat rigid containers are filled with different PCM with gradually increasing (or decreasing) melting points from one stage of said heat or cold storage multistage tower to another stage.

14. A heat or cold storage multistage tower as claimed in claim 1, wherein said flat rigid containers are constructed from ceramics with open porosity, impregnated by polymer material.

15. A cold storage multistage tower as claimed in claim 1, wherein water or aqueous solutions are used as said PCM and thin flexible sealed envelopes with a gaseous medium are arranged in said flat rigid containers.

16. A beat or cold storage multistage tower as claimed in claim 1, wherein said flat rigid containers comprise ceramic blocks; each said ceramic block is provided with a system of parallel vertical channels, which are alternatively open and sealed at their lower ends; said parallel vertical channels, which are sealed at their lower ends, are filled partially with PCM; said ceramic blocks are arranged in one or more layers on supporting grids installed in said housing; in addition, there are said distributors and redistributors installed in said housing for uniform distribution of said HTF.

17. A heat or cold storage multistage tower as claimed in claim 16, wherein the upper edges of said channels of said ceramic blocks are toothed.

18. A heat or cold storage multistage tower as claimed in claim 1, wherein said flat rigid containers comprise blocks from glass, glass ceramics or sulfur concrete.

* * * * *